United States Patent Office 3,124,422
Patented Mar. 10, 1964

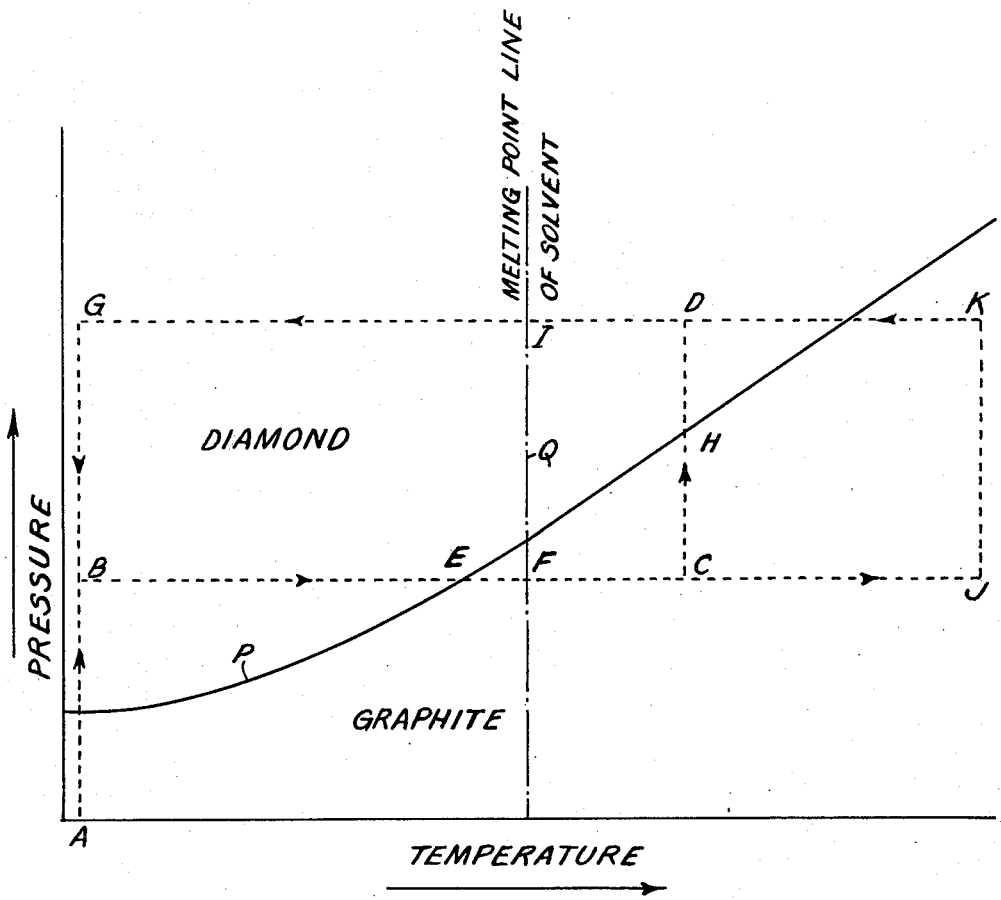

3,124,422
SYNTHESIS OF DIAMONDS
Jan F. H. Custers, Bernard W. Senior, Henry B. Dyer, and Peter T. Wedepohl, all of Johannesburg, Transvaal, Republic of South Africa, assignors to Adamant Laboratories (Proprietary) Limited
Filed July 20, 1961, Ser. No. 125,565
3 Claims. (Cl. 23—209.1)

This invention relates to the synthesis of diamonds.

Successful methods for the synthesis of diamonds have been described. Basically these methods involve the subjection of carbonaceous substances together with a solvent for carbon to high temperatures and pressures in the region where the solvent is molten and the pressure is higher than the thermodynamic equilibrium pressure between graphite and diamond at the operating temperature. These temperatures and pressures necessary for the formation of diamonds are herein referred to as the required or the final temperatures and pressures. Furthermore, the solution of carbon is supersaturated with respect to diamond under the operating conditions.

In processes described up to now the proportion of coarse diamond particles to finer particles tends to be rather low and lower than the relative demands for coarse and fine particles.

An object of the invention is to provide a process in which a greater proportion of the diamond particles are of a larger size and of a blockier shape than the crystals obtained with previously described processes.

According to the invention, a process for synthesizing diamonds by forming a saturated solution of carbon in a solvent and precipitating carbon out of the solution in the diamond zone of the diamond-graphite equilibrium diagram, includes the steps of bringing the mixture of carbon and solvent material to the required condition of temperature and pressure by increasing the temperature and pressure in such a way that the graphite-diamond line of the equilibrium diagram is crossed in the direction graphite-diamond when the solvent is molten; maintaining both temperature and pressure constant at their required level for a period of time, then decreasing the temperature; and finally reducing the pressure to atmospheric.

In the preferred form of the invention the pressure is increased first to a level below that at which the melting point line of the solvent intersects the equilibrium line and the mixture is then brought to a molten condition by increasing the temperature. The temperature may be increased to the required value and the solution brought through the equilibrium line by increasing the pressure at that temperature or the temperature could be increased still further, the pressure increased to its required value and the solution cooled down to the required temperature while keeping the pressure constant. With equipment presently available it is easier to move along a constant temperature line and increase the pressure to its optimum at a slow continuous rate or step by step.

The invention is further described with reference to the accompanying drawing which shows a phase diagram of carbon. Pressure is plotted against temperature. In the region above the equilibrium line P diamond is more stable than graphite while the reverse is the case under the line P. The chain line Q is the melting point line of the solvent. Depending on the solvent used it may be vertical as shown or it may slope either to the left or to the right.

The mixture of carbonaceous material and solvent is subjected to elevated temperatures and pressures in the following five steps:

(i) While keeping the temperature at approximately 20° C. (room temperature), the pressure is raised to a value of about half its final value. This stage is represented by going from A to B on the phase diagram.

(ii) The temperature is now raised to its final value. This is represented by going from B to C.

It is important that the pressure reached in (i) should not be so high that the carbon solvent is molten before the diamond-graphite equilibrium line is crossed in stage (ii). In other words, the temperature corresponding to E, where BC cuts the equilibrium line, should be lower than the melting point of the solvent. The reason for this will be explained later.

(iii) The situation has now been reached in which the solvent is molten and is dissolving the carbonaceous component of the reaction mixture. However, the pressure-temperature conditions are such that the reaction mixture is in the region of graphite stability, and nucleation and growth of diamond therefore do not take place.

In stage (iii) the pressure is raised at a controlled rate until its final value is reached. This corresponds to the line CD in the drawing. The optimum rate of increase of the pressure depends on the pressure-temperature conditions corresponding to C and D. However, a typical value is 1500 atmospheres per second.

It is during this stage that diamond growth in initiated. Shortly after crossing the equilibrium line at H, the solution of carbon in the solvent becomes supersaturated with respect to diamond, and nucleation and growth of diamond commence.

(iv) After reaching the conditions represented by D, these conditions are maintained for a time which depends on the pressure and temperature corresponding to D, but which is of the order of 5 minutes.

After this period, stage (iv) takes place, which is the reduction of the temperature to room temperature, as quickly as possible, while maintaining the pressure.

(v) In stage (v) the pressure is reduced to atmospheric after which the reaction mixture containing diamonds can be removed from the pressure chamber.

The same result may be achieved by following the cycle ABJKD. In this modification of the method another stage is introduced in which the temperature is lowered from K to D along a constant pressure line at a controlled rate.

The exact times, pressures and temperatures employed depend on the nature of the particular solvent, the size distribution of diamond required, the total yield of diamond required, the growth rate required, and other factors.

The examples given below show the results of experiments conducted using the methods of the invention—

*Example 1*

200 milligrams of graphite were placed in a pressure chamber together with 550 milligrams of nickel, that is the solvent. The pressure was then raised to 42,000 atmospheres over a period of 30 seconds. The temperature of the reaction mixture was then raised to 2100° C. over a period of a further minute. The pressure was then raised to 75,000 atmospheres over a period of a further 30 seconds, after which pressure and temperature were maintained for a further 5 minutes. The temperature was then reduced to 20° C. over a period of one minute, the initial drop from 2100° C. to 1400° C. occurring in approximately 5 seconds. Finally the pressure was reduced to atmospheric over a period of 1½ minutes.

After subjecting the reaction mixture to the conditions described above, approximately 60 milligrams of diamond were recovered from the pressure chamber.

On repetition of the process, approximately the same yield of diamond crystals was obtained in each case.

The total yield of diamond (approximately 500 milligrams) from 8 experiments was screened in the usual way and gave the following size analysis.

Size range (U.S. mesh size): Percent diamond by weight

| Size range | Percent |
|---|---|
| +60 | 23 |
| −60 +100 | 36 |
| −100 +140 | 15 |
| −140 +200 | 16 |
| −200 +325 | 9 |
| −325 | 1 |

The diamonds (especially in the larger size ranges) were well-formed, blocky single crystals, eminently suitable for use in metal bonded tools such as grinding wheels or saws.

*Example 2*

360 milligrams of graphite were placed in contact with 2000 milligrams of nickel in a high-pressure chamber. The arrangement of the constituents was somewhat different from that of Example 1. The reaction mixture was subjected to the same sequence of pressures and temperatures for the same periods of time, as that of Example 1. After the pressure had been reduced to atmospheric, approximately 110 milligrams of diamond were recovered from the reaction chamber. The experiment was repeated 22 times in all, approximately the same yield of diamond being obtained in each case.

The total yield of diamond (approxiamtely 2.4 grams) was screened in the usual way and gave the following size analysis.

| Size range (U.S. mesh size) | Percent diamond by weight |
|---|---|
| +60 | 44 |
| −60 +100 | 24 |
| −100 +140 | 12 |
| −140 +200 | 7 |
| −200 +325 | 8 |
| −325 | 5 |

*Example 3*

875 milligrams of graphite were placed together with 3800 milligrams of nickel in a high-pressure chamber, the arrangement of the constituents being somewhat similar to that of Example 1. The reaction mixture was subjected to substantially the same sequence of temperatures and pressures as that of Example 1, for the same periods of time. After reducing the pressure to atmospheric, approximately 310 milligrams of diamond were recovered from the pressure chamber.

The experiment was repeated 10 times in all, and the total yield of diamond screened in the usual way. The following size analysis was obtained.

| Size range (U.S. mesh size) | Percent diamond by weight |
|---|---|
| +60 | 24 |
| −60 +100 | 31 |
| −100 +140 | 16 |
| −140 +200 | 10 |
| −200 +325 | 10 |
| −325 | 9 |

*Example 4*

In order to test the reproducibility of the method, a further five experiments were conducted under the same conditions as those of Example 3, using the same reaction mixture.

An average yield of 340 milligrams of diamond per run was obtained, the size analysis being as follows.

| Size range (U.S. mesh size) | Percent diamond by weight |
|---|---|
| +60 | 15 |
| −60 +100 | 32 |
| −100 +140 | 18 |
| −140 +200 | 12 |
| −200 +325 | 11 |
| −325 | 12 |

*Example 5*

300 milligrams of graphite were placed in contact with 1300 milligrams of nickel in a high-pressure chamber, the arrangement of the constituents being similar to that of Example 1. The pressure was increased to 50,000 atmospheres over a period of 30 seconds. The temperature of the reaction mixture was then increased to 2600° C. over a period of a further 15 seconds, after which the pressure was raised to 80,000 atmospheres over a period of a further minute. The temperature was then reduced to 2200° C. over a period of a further 5 seconds. After maintaining these conditions for a further 5 minutes, the temperature was rapidly reduced to 20° C. The pressure was then reduced to atmospheric.

Approximately 100 milligrams of diamond were recovered from the pressure chamber. The size distribution was similar to that of the previous examples.

The size analyses given in the examples are to be compared with those obtained when the full pressure is applied at room temperature, after which the temperature is raised to its operating value. The following size analysis is typical of those obtained when the pressure is 75,000 atmospheres and the temperature 2100° C.

| Size range (U.S. mesh size) | Percent diamond by weight |
|---|---|
| +60 | 4 |
| −60 +100 | 8 |
| −100 +140 | 13 |
| −140 +200 | 18 |
| −200 +325 | 25 |
| −325 | 32 |

It can be seen that the methods of the invention yield a considerable improvement over these values.

It should be pointed out that the final step to the required conditions of temperature and pressure should be rapidly effected. Experience has shown that if the step be sluggishly carried out, the diamond yield is adversely affected. The probable reason is that the diamond formation seems to require the presence of seeds or nuclei to promote growth and that an excessive period of dwell in the hot region of graphite stability appears to destroy or inhibit the seeds or nuclei. These seeds may well be a crystalline graphite, although it is not certain that this is so.

While one does not wish to be bound by theory, the improved size and shape of the diamonds grown by the method of the invention may be explained as follows:

In the usual method of growing diamond crystals, the pressure is first raised to its final value, while keeping the temperature of the reaction mixture at approximately 20° C., after which the temperature is raised to its final value over a period of approximately 30 seconds. This is equivalent to going from A to G, and then from G to D.

The region ID has to be traversed, i.e. a region which is far into the diamond-stable region of the phase diagram, and in which the solvent is molten. These are conditions under which profuse nucleation and growth of diamond occur. Even if the region ID be traversed very rapidly, a very large number of small nuclei is formed. When the final (pressure, temperature) conditions are reached at D, further growth takes place on these nuclei, so that one finally has a large number of relatively small diamonds. If the number of nuclei could be restricted, the carbon atoms available for diamond formation would be deposited on these few nuclei only, so that a smaller number of relatively large diamonds would be obtained.

This is in fact what is achieved by the methods described in the present application. In stage (iii) when the region CD is traversed, the supersaturation of the solution of carbon in the solvent gradually increases until nucleation and growth of diamond commence, and then continue under controlled conditions. Conditions of profuse nucleation and growth never occur.

If the cycle ABJKD be followed, the above conditions of growth are duplicated in the region K to D.

It is well-known that in order to grow blocky crystals of any material, the rate of growth must be relatively slow. This is another advantage of the method of the invention—growth occurs under slow, controlled conditions so that relatively large, blocky diamonds are formed.

We claim:

1. In a process for synthesizing diamonds by forming a saturated solution of carbon in a solvent and subjecting the saturated solution simultaneously to high pressure and temperature to bring the solution into that zone of the diamond-graphite equilibrium diagram in which diamond is the stable phase of carbon, thereby causing carbon to precipitate out of the solution in the form of diamond; the steps of subjecting a mixture of carbon and solvent to pressure and temperature to melt the solvent while the mixture is in the zone of the equilibrium diagram in which graphite is the stable phase, increasing the temperature and pressure to bring the solution into the diamond zone; maintaining both temperature and pressure constant at their required level for a period of time, then decreasing the temperature; and finally reducing the pressure to atmospheric.

2. In the process of claim 1 the steps of first increasing the pressure to a level below that at which the melting point line of the solvent intersects the equilibrium line of the equilibrium diagram, then melting the solvent by increasing the temperature while keeping the solution in the graphite zone of the equilibrium diagram, and then rapidly increasing the pressure to the required level.

3. In the process of claim 1 the steps of first increasing the pressure to a level below that at which the melting point line of the solvent intersects the equilibrium line of the equilibrium diagram, then melting the solvent by increasing its temperature to a value in excess of the final required value, while keeping the solution in the graphite zone of the equilibrium diagram, then increasing the pressure to the final required value, and then rapidly reducing the temperature to its final required value while keeping the pressure constant.

References Cited in the file of this patent
UNITED STATES PATENTS 2,947,610   Hall et al. _____ Aug. 2, 1960